United States Patent [19]
Whetstone, Jr.

[11] Patent Number: 5,925,391
[45] Date of Patent: Jul. 20, 1999

[54] EDIBLE AND NONEDIBLE PRODUCT

[76] Inventor: Henry M. Whetstone, Jr., 400 Old Quarry Rd., St. Augustine, Fla. 32086

[21] Appl. No.: 09/064,573

[22] Filed: Apr. 22, 1998

[51] Int. Cl.⁶ .................. A23G 3/00; A23G 1/00
[52] U.S. Cl. .............. 426/90; 426/89; 426/104; 426/132; 426/138
[58] Field of Search .................. 426/89, 90, 104, 426/132, 138

[56] References Cited

U.S. PATENT DOCUMENTS

| | | |
|---|---|---|
| 211,420 | 1/1879 | Moses . |
| 294,575 | 3/1884 | Britton . |
| 340,534 | 4/1886 | Wright . |
| 2,858,955 | 11/1958 | Kroenert .................. 220/4 |
| 3,292,840 | 12/1966 | Schmidt .................. 229/8 |
| 4,106,657 | 8/1978 | Dogliotti .................. 220/23.4 |
| 4,124,135 | 11/1978 | Weder et al. .................. 220/4 |
| 4,593,817 | 6/1986 | Ferrero .................. 206/457 |
| 5,728,414 | 3/1998 | Terrasi .................. 426/104 |

FOREIGN PATENT DOCUMENTS

| | | | |
|---|---|---|---|
| 0278576 | 8/1988 | European Pat. Off. .......... 426/104 |
| 2324344 | 12/1974 | Germany .................. 426/132 |
| 416970 | 9/1934 | United Kingdom .......... 426/138 |
| WO 93/00267 | 1/1993 | WIPO .................. 426/104 |
| WO 93/03624 | 3/1993 | WIPO .................. 426/132 |

*Primary Examiner*—Anthony J. Weier
*Attorney, Agent, or Firm*—Holland & Knight LLP

[57] ABSTRACT

A combination edible and non-edible product is included which has a housing formed of first and second sections of plastic or other non-edible material interconnected to form a hollow interior adapted to receive a toy or other item. At least one of the first and second sections includes a radially outwardly extending rib having opposed side edges and an outer edge, and their outer surfaces each carry a layer of confectionery such as chocolate having a peripheral edge which abuts one of the side edges of the rib leaving the entire outer edge of the rib exposed and readily viewable. The entire article is then covered with a foil wrap or the like.

23 Claims, 3 Drawing Sheets

EDIBLE AND NONEDIBLE PRODUCT

FIELD OF THE INVENTION

This invention relates to combination edible and non-edible products, and, more particularly, to a product having a non-edible housing formed with a hollow interior which receives a toy or other item and a layer of edible material such as chocolate partially covering the housing.

BACKGROUND OF THE INVENTION

Small novelty items, miniature toys and edible snack items are commonly sold in containers formed of a non-edible material such as plastic. Containers of this type are typically egg-shaped or round and comprise two half sections which are releasably interconnected at their peripheral edges forming a hollow interior within which the toy or other item is contained.

In addition to distributing candies and other confectionery items within containers of the type described above, a variety of food "packages" have been introduced to market and sell confectioneries. In many instances, the confectionery item is hollow and formed in a shape appealing to children, e.g., eggs or different animal shapes such as bunnies and the like.

Both of the above-described packages or containers for the marketing of toy items and confectioneries suffer from limitations and deficiencies. Plastic containers having a prize or edible product in the interior often fail to capture the attention of children, even when decorated with bright colors or distinctive designs. While hollow confectionery items often do attract attention, they can present problems of damage and waste when displayed at retail establishments. The tendency of consumers and especially children, is to handle such items causing the walls made of thin chocolate or like to collapse and thus break the product. Although hollow confectionery items can be sold in protective boxes, cartons or trays, this adds significantly to the cost of such items and reduces the novelty appeal of the product.

One attempt to solve the deficiencies of the products described above is a combination edible and non-edible product. In one design of this type, a plastic container formed of two half sections is first assembled with a novelty item or toy in its hollow interior, and then the entire container is placed within or embedded into the hollow confectionery such as chocolate. This combination product is attractive to children both because of the chocolate on the outside and the presence of a prize or toy on the inside. Additionally, since the chocolate or other confectionery layer is applied to and supported by the wall of the plastic container, the product can be handled without collapsing the thin layer of chocolate.

A perceived disadvantage of the combination edible and non-edible product described above involves a safety question, particularly concerning young children. Products of this type are sold with a foil wrapping around the entire exterior surface which is initially peeled away by the adult or child. When the foil wrap is removed, the child sees a continuous surface of confectionery material, such as chocolate, and nothing else. The plastic container is completely embedded and hidden from view by the continuous outer layer of chocolate or other confectionery. Heat is often used to melt chocolate in order to join two sections together when forming a hollow egg or other shape containing a plastic toy. Portions of this melted chocolate often adhere to the outer surface of the plastic container, and remain in place thereon when the foil wrap is removed. In order for a child to gain access to the toy or prize within the interior of the plastic container, he or she must chew or lick the chocolate away from the container's outer surface so that it can be handled for opening. It is of some concern that in the course of eating away the chocolate layer from the outer surface of the container, the half sections of the container may disengage one another allowing the child to accidentally ingest the toy or novelty item within the container interior while he or she is in the process of eating the chocolate layer.

SUMMARY OF THE INVENTION

It is therefore among the objectives of this invention to provide a combination edible and non-edible product which is safe for use by children of all ages, which is capable of containing a toy, novelty item or edible item and which can be constructed in a variety of shapes and designs.

These objectives are accomplished in a combination edible and non-edible product comprising a housing formed of first and second sections of plastic or other non-edible material interconnected to form a hollow interior adapted to receive a toy or other item. At least one of the first and second sections includes a radially outwardly extending rib having opposed side edges and an outer edge, and their outer surfaces each carry a layer of confectionery such as chocolate having a peripheral edge which abuts one of the side edges of the rib leaving the entire outer edge of the rib exposed and readily viewable. The entire article is then covered with a foil wrap or the like.

This invention is predicated upon the concept of creating a combination edible and non-edible product which is completely safe for use by children of all ages. This is accomplished by two important aspects of the subject invention. First, at least one of the first and second sections forming the plastic housing of the product includes a radially outwardly extending rib having opposed side edges and an outer edge. While the outer surface of each section of the housing is covered by a layer of chocolate or other confectionery, such layers abut one of the side edges of the rib without covering the outer edge thereof. Consequently, when a child removes the foil wrap from the product of this invention, the outer edge of the rib is readily visible indicating the presence of a plastic container beneath the chocolate layers. In alternative embodiments, the outer edge of the rib is covered by a tape, or a tamper-evident seal, which first must be removed by the child before gaining access to the interior of the housing.

A second aspect of this invention which overcomes safety concerns of prior products is that each outer layer of chocolate or other confectionery carried by the sections of the housing is removably mounted on the surface thereof. In one presently preferred embodiment, such confectionery layers are formed in a separate, precision molding operation and then slidably received on the outer surface of a respective first and second section of the housing. When the foil wrap is removed from the article, the confectionery layers readily separate and fall away from the housing so that the child is free to grasp the housing and separate the two sections without first eating away at the chocolate layers as in the prior design noted above. Consequently, a younger child has no reason to place his or her mouth on the outside of the housing of this invention to any greater extent than would otherwise be the case with conventional plastic containers in which small toys and novelty items are commonly sold.

In one presently preferred embodiment, each side edge of the rib is formed with a number of projections which become embedded within the abutting peripheral edge of the layer of confectionery placed on an outer surface of the housing sections. The purpose of these projections is to temporarily retain the confectionery layers in place on the outer surfaces of the housing sections during processing of the article, i.e., immediately prior to transfer of the article to the wrapping station for application of the foil wrap to its exterior surface. Even in this embodiment, the confectionery layer falls away from the housing sections when the foil wrap is removed, allowing the confectionery layers to completely separate from the housing.

DESCRIPTION OF THE DRAWINGS

The structure, operation and advantages of the presently preferred embodiment of this invention will become apparent upon further consideration of the following description, taken in conjunction with the accompanying drawings, wherein.

DETAILED DESCRIPTION OF THE INVENTION

Figure 1:
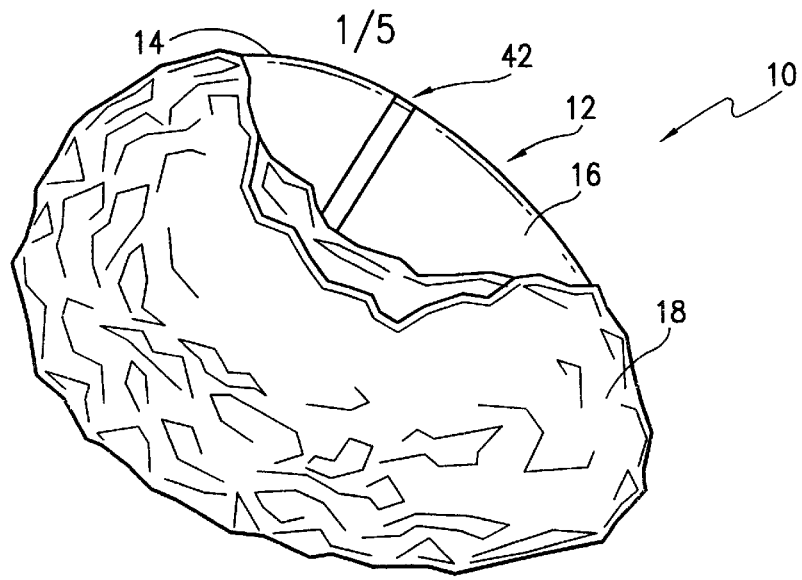
FIG. 1 is a perspective view of the article of this invention with the outer foil wrap partially removed to reveal the confectionery layers and rib beneath.
Figures 2A, 2B:
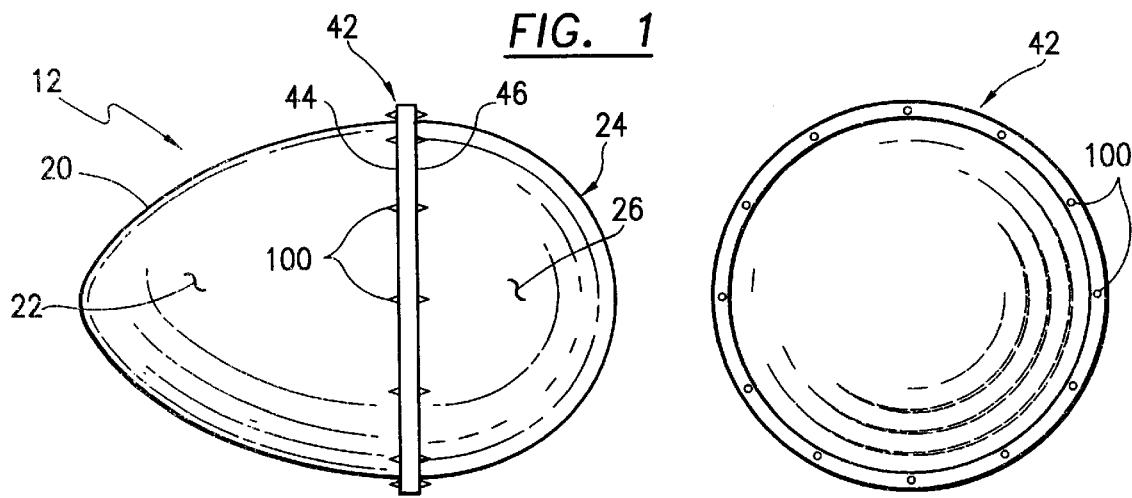
FIG. 2A is a side view of the article shown in FIG. 1 with the foil wrap and edible layers removed.
FIG. 2B is an end view of the article of FIG. 2A.

Referring now to FIGS. 1–4, the combination edible and non-edible product 10 is illustrated in detail. The product 10 generally comprises a housing 12, two sections or layers 14 and 16 of an edible material, and, an outer wrap 18 formed of a foil material such as metal, aluminum or the like. The product 10 is depicted in the Figures as having an egg shape, although it should be understood that product 10 could be of essentially any other configuration including spherical, oval, square, rectangular, or in the shape of any figure such as a rabbit and the like. Each of the individual elements of the product 10 is discussed separately below.

The housing 12 comprises a first section 20 having an outer surface 22 and a second section 24 having an outer surface 26. The first and second sections 20, 24 are formed of a non-edible material such as plastic, composite or essentially any other lightweight flexible material. The first and second sections 20, 24 are interconnected by any one of a number of joint connections 28, the construction of which is described in more detail below in connection with the discussion of FIGS. 5–10. When assembled, the first and second sections 20, 24 define a hollow interior 30 which can receive a miniature toy 31, a novelty item, an edible product such as jelly beans or the like, or other items.

As noted above, the first and second sections 20, 24 are interconnected at a joint connection, and a number of variants of same are illustrated in FIGS. 5–10. For purposes of the present discussion, the joint connections of this invention are divided into three general categories including those depicted in FIGS. 5–7, the joint connections 28' of FIGS. 8 and 9, and, the joint connection 28" of FIG. 10.

Figure 3:
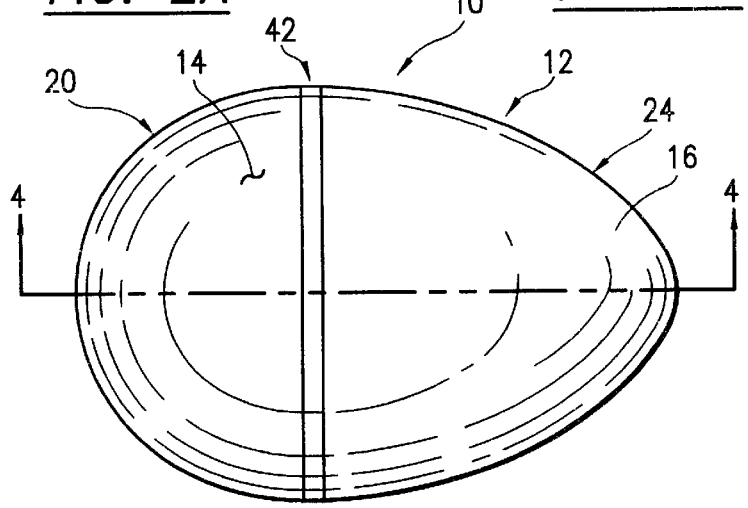
FIG. 3 is a side view of the article depicted in FIG. 1 with the foil wrap removed.
Figure 5:
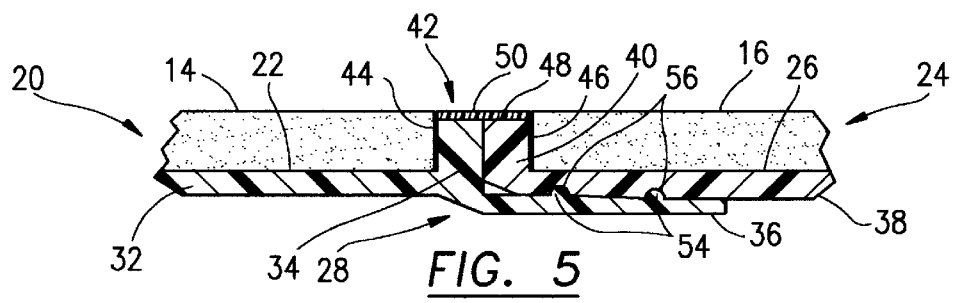
FIG. 5 is an enlarged, partial cross-sectional view of one embodiment of the joint connection of this invention.
Figure 6:
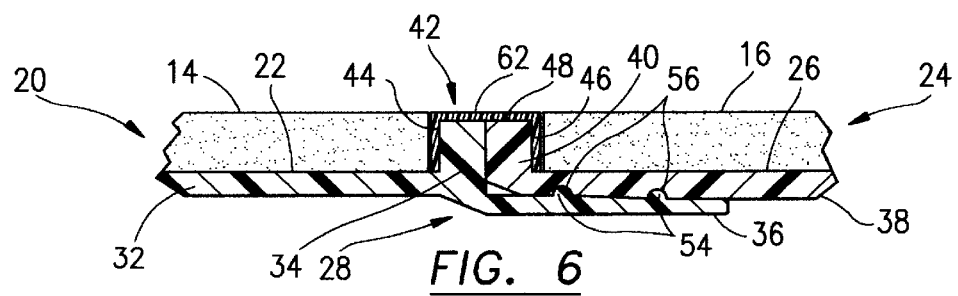
FIG. 6 is a view similar to FIG. 5 except with a tamper-evident band on the rib formed by the housing sections.
Figure 7:
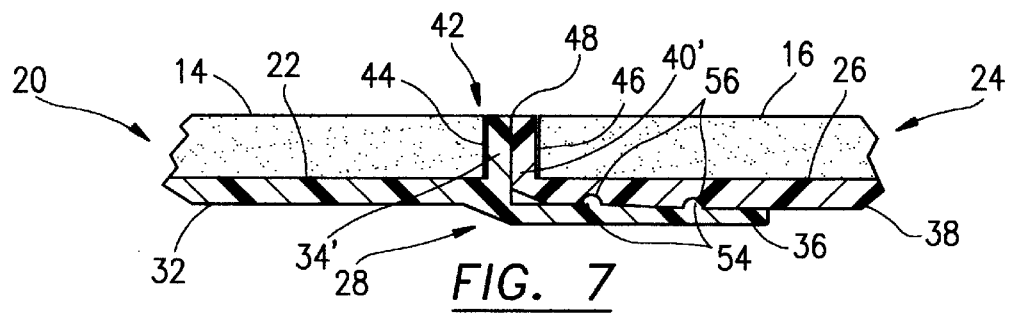
FIG. 7 is a variation of the joint connection and rib depicted in FIGS. 5 and 6.

Referring initially to FIGS. 5–7, the first section 20 of housing 12 includes a wall 32 terminating in a peripheral edge defined by a circumferentially extending flange 34 and a wall extension 36. The second section 24 has a wall 38 terminating at a peripheral edge defined by a flange 40. When the first and second sections 20, 24 are connected together, the flange 34 of first section 20 abuts the flange 40 of second section 24 thus collectively forming a rib 42 having a side edge 44 defined by flange 34, a side edge 46 defined by flange 40 and an outer edge 48 extending therebetween. As depicted in FIG. 3, the rib 42 extends radially outwardly from the outer surfaces 22, 26 of sections 20, 24, respectively, in a direction away from the interior 30 of housing 12. In this embodiment, the outer edge 48 of rib 42 is covered by a tape 50 to assist in retaining the sections 20, 24 together.

The locking structure of the joint connections 28, 28' and 28" which retains the sections 20, 24 in assembled relation is substantially identical in all embodiments shown in FIGS. 5–10. Preferably, such locking structure includes a pair of circumferentially extending projections 54 formed on the wall extension 36 of first section 20, which mate with corresponding recesses 56 formed on the inside surface of the wall 38 of second section 24. This locking structure retains the sections 20, 24 securely in engagement with one another, but can be readily disengaged to permit access to the housing interior 30.

The embodiment of FIG. 6 is essentially identical to that of FIG. 5 and same reference numbers are applied to like structural elements in both Figs. The difference is the provision of a heat-shrinkable, tamper-evident band 62 along the rib 42 in FIG. 6, which provides an indication when the sections 20, 24 have been separated from one another. The tamper-evident band 62 extends completely around the rib 42, i.e., along side edges 44, 46 and the outer edge 48, as shown.

Figure 4:
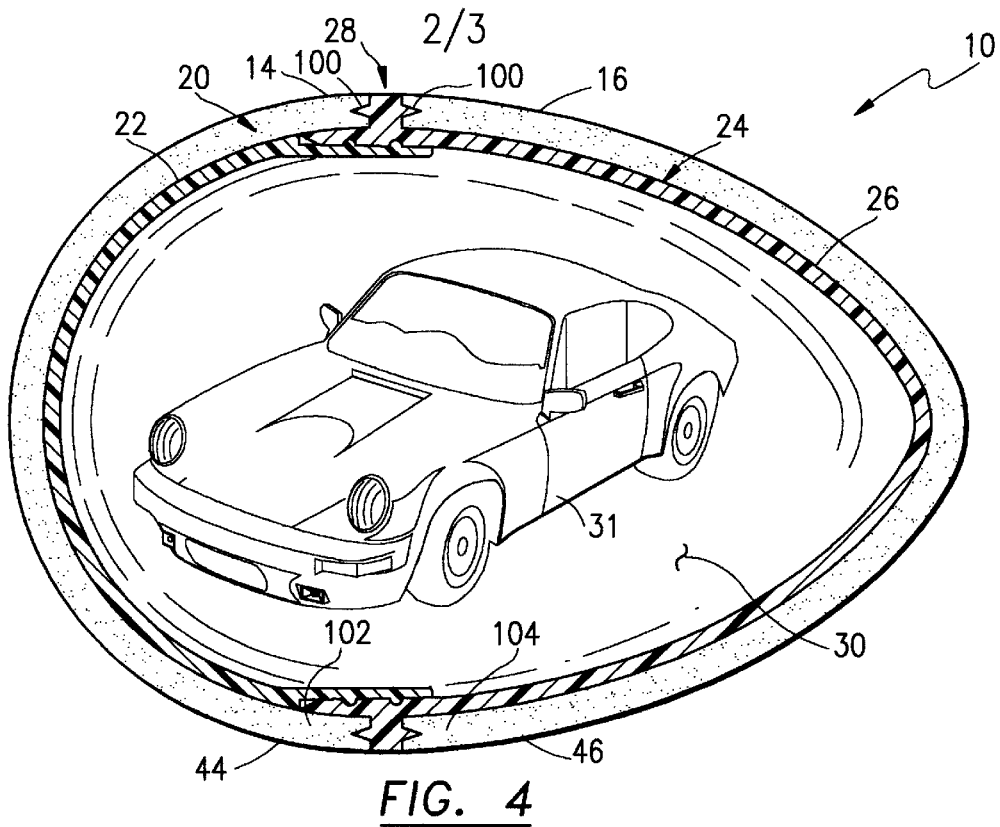
FIG. 4 is a cross-sectional view taken generally along line 4—4 of FIG. 3.

With respect to the embodiment of FIG. 7, flanges 34' and 40' are employed which are functionally identical to flanges 34 and 40 depicted in FIGS. 3 and 4 except the overall width of flanges 34', 40' is smaller. Otherwise, the joint connection 28 is the same as in FIGS. 5 and 6.

Figure 8:
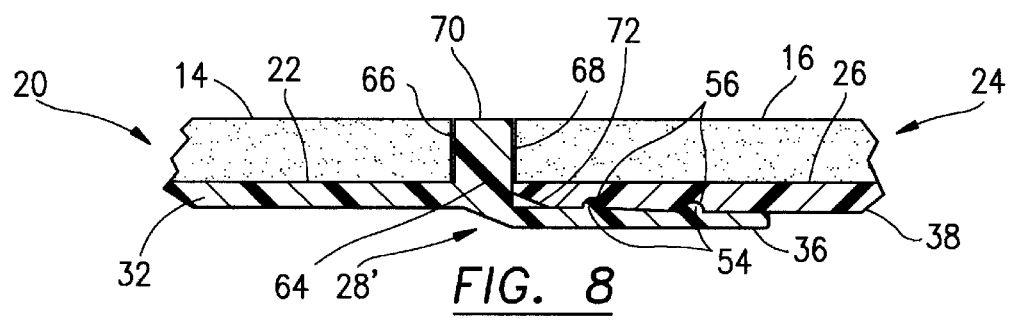
FIG. 8 is a further embodiment of the joint connection between the two sections of the housing of the article herein.
Figure 9:
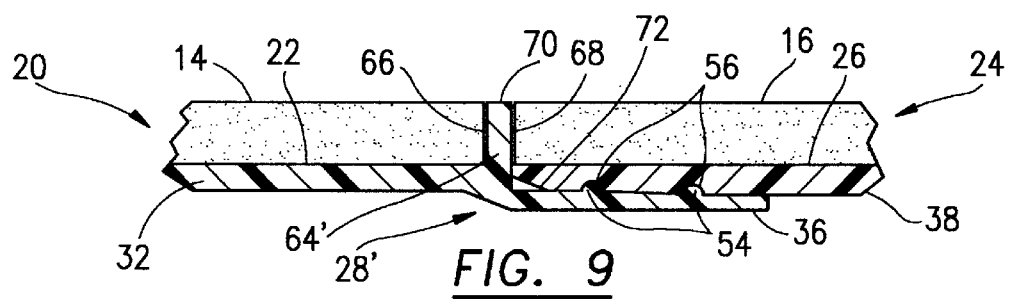
FIG. 9 is a variation of the joint connection and rib depicted in FIG. 5.

Referring now to FIGS. 8 and 9, a different construction is employed at the juncture of first and second sections 20, 24 compared to that of FIGS. 5–7. In these embodiments, the wall 32 of first section 20 terminates with a rib 64 having opposed side edges 66 and 68 with an outer edge 70 therebetween. The wall 38 of second section 24 has a tapered peripheral edge 72 which abuts the side edge 68 of rib 64 formed on the first section 20. In FIG. 9, the wall 32 of first section 20 terminates with a rib 64' having a much thinner cross-section than that of rib 64 in FIG. 8, but is otherwise functionally identical. Both of the embodiments depicted in FIGS. 8 and 9 employ a joint connection 28' formed by engagement of tapered, peripheral edge 72 of wall 38 of second section 24 with the side edge 68 of rib 64 formed in the first section wall 32. The locking structure of joint connection 28' is the same as that in FIGS. 5–7, i.e., the projections 54 on wall extension 36 of first section 20 releasably engage the recesses 56 on the wall 38 of second section 24.

Figure 10:
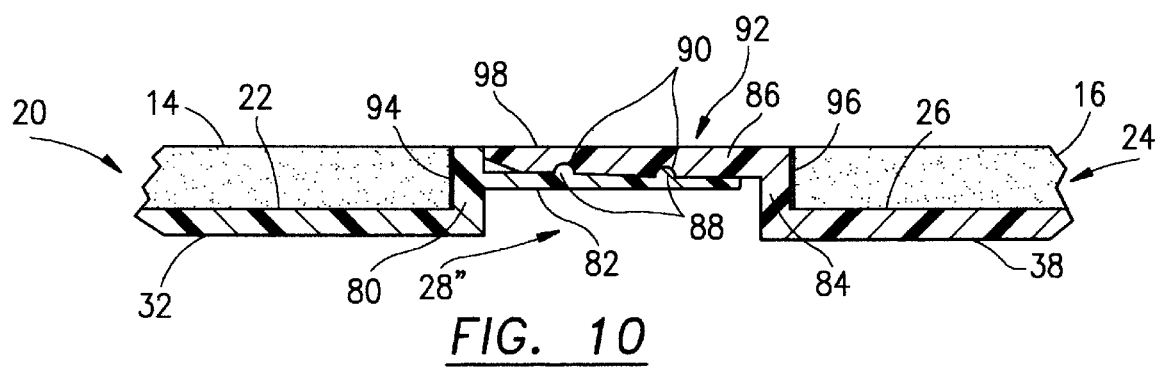
FIG. 10 is still another embodiment of the joint connection and rib formed by the housing sections of the article of this invention.

With reference to FIG. 10, the wall 32 of first section 20 has a peripheral edge defined by a radially outwardly extending flange 80 connected to an extension 82. Similarly, the peripheral edge of wall 38 of second section 24 has an outwardly extending flange 84 which mounts an extension 86. A joint connection 28" is formed by the extensions 82, 86 in which the extension 86 overlaps extension 82 at a location radially outwardly spaced from the outer surfaces 22, 26 of sections 20, 24, respectively. The extension 82 of first section 20 includes radially outwardly extending projections 88 which mate with recesses 90 formed in the inner surface of extension 86 of second section 24 to provide a locking structure similar to that of FIGS. 5–9. With the extensions 82, 86 connected at their mating projections 88 and recesses 90, the peripheral edges of walls 32 and 38 form a rib 92 having one side edge 94 defined by the flange 80 of first section 20, and opposed side edge 96 defined by the flange 84 of second section 24, and, an outer edge 98 defined by the extension 86 of second section 24.

As depicted in FIGS. 1 and 4–10, the layers 14 and 16 of edible material are carried on the outer surface 22 of first section 20 and the outer surface 26 of second section 24, respectively. In the presently preferred embodiment, the layers 14 and 16 are made of chocolate or other confectionery material, although other edible materials can be utilized. One important aspect of this invention is that the layers 14 and 16 are formed in a separate processing step, such as molding or dipping, and then slidably placed upon the first and second sections 20, 24 after such sections have been assembled. The thickness of each layer 14 and 16 is substantially the same as the height of the ribs 42, 64 or 92 so that such layers 14, 16 are substantially flush with the outer edges 48, 70 and 98 of ribs 42, 64 and 92, respectively. In this manner, the outer edge of each rib 42, 64 and 92 is readily visible when the outer wrap 18 is removed, thus clearly alerting a child or adult to the presence of the housing 12 beneath confectionery layers 14 and 16. The provision of a tape 50 in the embodiment of FIG. 5, and a heat-shrinkable, tamper-evident seal 62 in the embodiment of FIG. 6, provides additional evidence of the presence of housing beneath the confectionery layers 14, 16.

As noted above, the confectionery layers 14, 16 are slidably received on the outer surfaces 22, 26 of sections 20, 24. When the foil wrap 18 is removed, such layers 14, 16 readily fall away from the housing 12 to facilitate separation of the housing sections 20, 24 and consumption of the layers 14, 16. In the embodiment depicted in FIGS. 2A, 2B and 4, the side edges 44, 46 of rib 42 are each formed with a number of protrusions 100 which are positioned to engage and at least partially embed within the peripheral edges 102 and 104 of layers 14, 16, respectively. The purpose of protrusions 100 is to temporarily retain the layers 14, 16 in place on the outer surfaces 22, 26 of sections 20, 24 during processing of product 10, i.e., from the time such layers 14, 16 are assembled on the sections 20, 24 until the outer wrap 18 is applied. These protrusions 100 readily permit the layers 14, 16 to separate from the housing 12 once the outer wrap 18 is opened.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the protrusions 100 are shown on the side edges 44, 46 of rib 42 in position to engage the peripheral edges 102, 104 of layers 14, 16. It is contemplated that protrusions could alternatively be formed on the sections 20, 24, i.e., extending radially outwardly from the outer surfaces 22, 26 thereof, to engage and embed within the layers 14, 16.

Therefore, it is intended that the invention not be limited to the particular embodiment disclosed as the best mode contemplated for carrying out this invention, but the invention will include all embodiments falling within the scope of the appended claims.

What is claimed is:

1. An article, comprising:

a housing including a first section formed of a non-edible material releasably connected to a second section formed of a non-edible material, said first and second sections each having an outer surface and collectively forming a hollow interior adapted to receive an object, at least one of said first and second sections being formed with a rib extending externally of said hollow interior, said rib having opposed side edges and an outer edge extending between said side edges;

a third section and a fourth section each formed of an edible material, said third section being carried on said outer surface of said first section and said fourth section being carried on said outer surface of said second section, each of said third and fourth sections having a peripheral edge which substantially abuts one of said opposed side edges of said rib while said outer edge of said rib is left exposed;

an outer wrap for covering said third and fourth sections and said outer edge of said rib.

2. The article of claim 1 in which said object is a toy.

3. The article of claim 1 in which said object is at least one item of edible material.

4. The article of claim 1 in which said third and fourth sections are each formed of a layer of chocolate.

5. The article of claim 1 in which each of said first and second sections has a peripheral edge formed with a radially outwardly extending flange, said flanges abutting one another upon connection of said first and second sections to form said rib.

6. The article of claim 5 further including a strip of tape releasably affixed along said outer edge of said rib at the juncture of said abutting flanges of said first and second sections.

7. The article of claim 5 further including a tamper-evident seal releasably affixed along said outer edge of said rib and along said side edges of said rib formed by said abutting flanges of said first and second sections.

8. The article of claim 1 in which said outwardly extending rib is formed solely on one of said first and second sections.

9. The article of claim 1 in which said first section has a wall forming a closed end and an open end, said open end of said wall including a peripheral edge formed with a flange and a wall extension, said second section having a wall forming a closed end and an open end, said open end of said wall including a peripheral edge formed with a flange and a wall extension, said first and second sections being interconnected so that the respective wall extensions thereof engage one another to form said outer edge of said rib and so that each flange of said first and second sections forms one of said side edges of said rib.

10. The article of claim 1 in which said third and fourth sections are slidably received on said outer surfaces of said first and second sections, respectively, without adhering thereto.

11. The article of claim 1 in which each of said opposed side edges of said rib is formed with a number of projections which embed within said peripheral edges of said third and fourth sections to at least temporarily retain said third and fourth sections on said outer surfaces of said first and second sections, respectively.

12. An article, comprising:
a housing including a first section formed of a non-edible material releasably connected to a second section formed of a non-edible material, said first and second sections each having an outer surface and collectively forming a hollow interior adapted to receive an object, at least one of said first and second sections being formed with a rib extending externally of said hollow interior, said rib including opposed side edges each formed with a number of protrusions and an outer edge extending between said side edges;
a third section and a fourth section each formed of an edible material, said third section being carried on said outer surface of said first section and said fourth section being carried on said outer surface of said second section, each of said third and fourth sections having a peripheral edge which engages said protrusions on one of said side edges of said rib to at least temporarily retain said third and fourth sections in position on said first and second sections while said outer edge of said rib is left exposed;
an outer wrap for covering said third and fourth sections and said outer edge of said rib.

13. The article of claim 12 in which said object is a toy.

14. The article of claim 12 in which said object is at least one item of edible material.

15. The article of claim 12 in which said third and fourth sections are each formed of a layer of chocolate.

16. The article of claim 12 in which each of said first and second sections has a peripheral edge formed with a radially outwardly extending flange, said flanges abutting one another upon connection of said first and second sections to form said rib.

17. The article of claim 16 further including a strip of tape releasably affixed along said outer edge of said rib at the juncture of said abutting flanges of said first and second sections.

18. The article of claim 16 further including a tamper-evident seal releasably affixed along said outer edge of said rib and along said side edges of said rib formed by said abutting flanges of said first and second sections.

19. The article of claim 12 in which said outwardly extending rib is formed solely on one of said first and second sections.

20. The article of claim 12 in which said first section has a wall forming a closed end and an open end, said open end of said wall including a peripheral edge formed with a flange and a wall extension,
said second section having a wall forming a closed end and an open end, said open end of said wall including a peripheral edge formed with a flange and a wall extension, said first and second sections being interconnected so that the respective wall extensions thereof engage one another to form said outer edge of said rib and so that each flange of said first and second sections form one of said side edges of said rib.

21. The article of claim 12 in which said third and fourth sections are slidably received on said outer surfaces of said first and second sections, respectively, without adhering thereto.

22. An article, comprising:
a housing including a first section formed of a non-edible material releasably connected to a second section formed of a non-edible material, said first and second sections each having an outer surface and collectively forming a hollow interior adapted to receive an object, at least one of said first and second sections being formed with a rib extending externally of said hollow interior, said first and second sections each having a number of protrusions;
a third section and a fourth section each formed of an edible material, said third section being carried on said outer surface of said first section and said fourth section being carried on said outer surface of said second section, each of said third and fourth sections having a peripheral edge which substantially abuts one of said side edges of said rib, said third and fourth sections each engaging said protrusions on respective first and second sections which at least temporarily retain said third and fourth sections in position on said first and second sections while said outer edge of said rib is left exposed;
an outer wrap for covering said third and fourth sections and said outer edge of said rib.

23. The article of claim 22 in which said rib is formed with opposed side edges, said protrusions being formed on each of said side edges of said rib in position to engage and embed within said peripheral edge of one of said third and fourth sections.

* * * * *